United States Patent [19]

Tsuboi

[11] Patent Number: 5,083,148

[45] Date of Patent: Jan. 21, 1992

[54] DRIVING POWER TRANSMITTING DEVICE FOR CAMERA

[75] Inventor: Takayuki Tsuboi, Kanagawa, Japan

[73] Assignee: Canon Kabushiki Kaisha, Tokyo, Japan

[21] Appl. No.: 696,253

[22] Filed: Apr. 29, 1991

Related U.S. Application Data

[63] Continuation of Ser. No. 608,611, Oct. 31, 1990, abandoned, which is a continuation of Ser. No. 497,836, Mar. 22, 1990, abandoned, which is a continuation of Ser. No. 393,815, Aug. 11, 1989, abandoned, which is a continuation of Ser. No. 897,336, Aug. 15, 1986, abandoned.

[30] Foreign Application Priority Data

| Aug. 20, 1985 | [JP] | Japan | 60-181031 |
| Aug. 20, 1985 | [JP] | Japan | 60-181032 |
| Aug. 20, 1985 | [JP] | Japan | 60-181033 |

[51] Int. Cl.$^5$ .................... G03B 1/00; G03B 13/36; G03B 5/00; G03B 7/00
[52] U.S. Cl. .................... 354/400; 354/412; 354/435; 354/173.1; 354/195.1; 354/214
[58] Field of Search ............... 354/400, 403, 404, 405, 354/410, 412, 435, 456, 173.1, 173.11, 195.1, 195.12, 214, 234.1

[56] References Cited

U.S. PATENT DOCUMENTS

| 4,204,759 | 5/1980 | Yamada et al. | 354/173.1 |
| 4,294,527 | 10/1981 | Hashimoto et al. | 354/173.1 X |
| 4,508,442 | 4/1985 | Hirohata | 354/234.1 X |
| 4,601,563 | 7/1986 | Miyawaki et al. | 354/173.1 X |
| 4,614,416 | 9/1986 | Suzuki et al. | 354/173.1 X |
| 4,671,639 | 6/1987 | Kodaira et al. | 354/400 |
| 4,684,233 | 8/1987 | Kodaira et al. | 354/400 |
| 4,696,559 | 9/1987 | Kondo | 354/195.1 |

Primary Examiner—W. B. Perkey
Attorney, Agent, or Firm—Toren, McGeady & Associates

[57] ABSTRACT

A driving power transmitting device for a camera having an electric motor, a first driving member to be moved by the driving power of the motor, first transmitting device for engagement with the first driving member when the first driving member moves in a predetermined direction by a predetermined distance, and to cause the transmitting path of the driving power of the motor to change by that engagement, a second driving member to be moved by the driving power of the motor, a follow-up member for following up the second driving member in delay, and second transmitting means for causing the transmitting path of the driving power of the motor to change when the follow-up member has caught up with the second driving member, as the second driving member has stopped, whereby the driving power of the motor is branchingly transmitted to each mechanism of the camera.

67 Claims, 11 Drawing Sheets

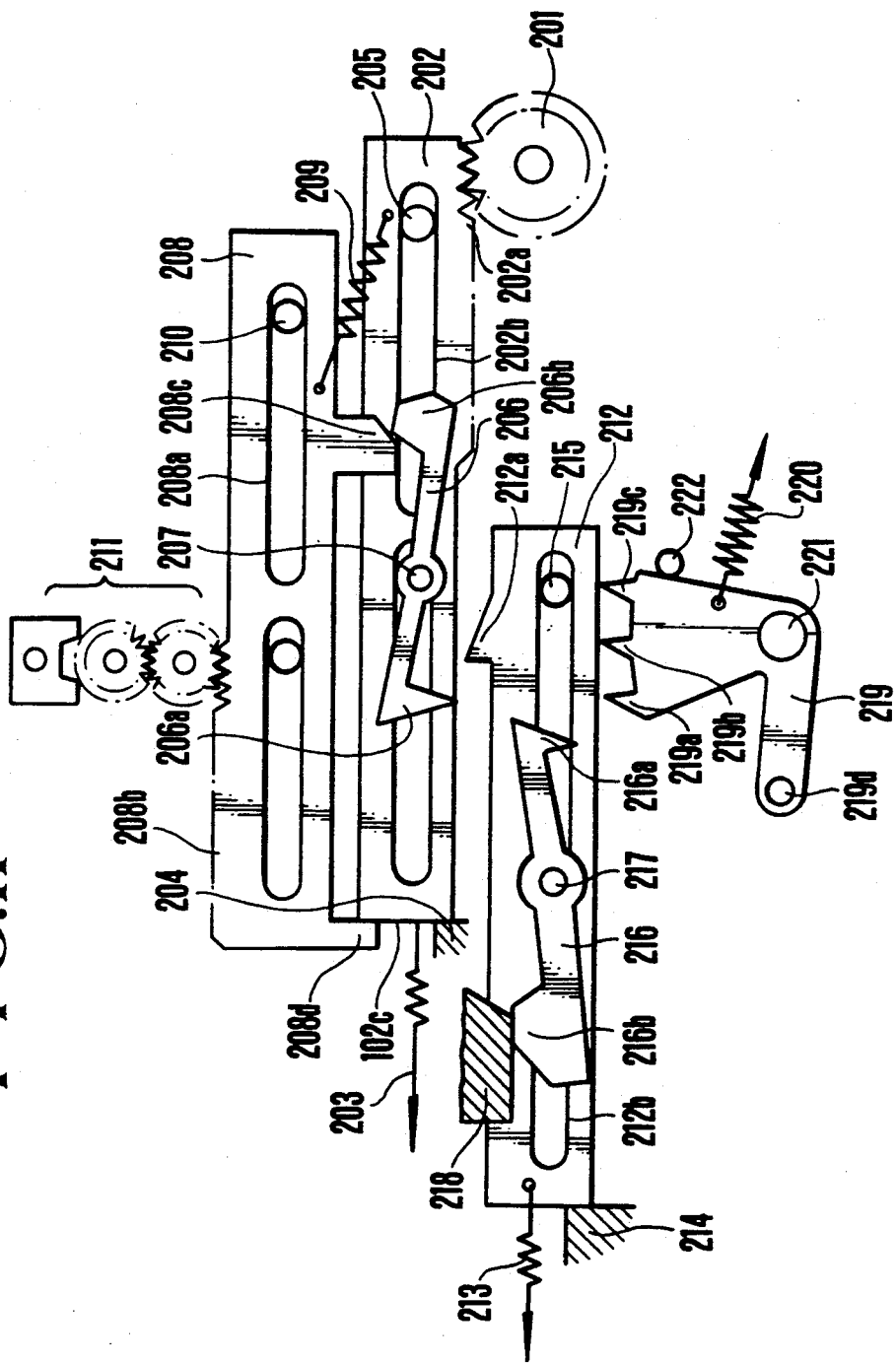

DRIVING POWER TRANSMITTING DEVICE FOR CAMERA

This is a continuation application of Ser. No. 07/608,611, filed Oct. 31, 1990; which in turn is a continuation application of Ser. No. 07/497,836, filed Mar. 22, 1990; which in turn is a continuation application of Ser. No. 07/393,815, filed Aug. 11, 1989; and which in turn is a continuation application of Ser. No. 06/897,336, filed Aug. 15, 1986, all now abandoned.

BACKGROUND OF THE INVENTION

1. Field of the Invention

This invention relates to improvements of the driving power transmitting device of a camera for transmitting the driving power of an electric motor branchingly to each mechanism of the camera.

2. Description of the Related Art

Recently, automation of camera advances, and cameras in which, for example, normal and reverse rotation of a motor is utilized in performing film driving, photographic lens driving, or shutter driving, are proposed, and available in the market. Yet, in these publicly known cameras, it is common that, for the normal and reverse rotation of one motor, the driving power is transmitted only to one respective system. For this reason, in the case when the above-described various functions were are worked by utilizing the outputs of the respective motors, many motors had to be arranged within the camera.

Also, in the camera where film winding-up is performed by the normal rotation of a motor, and rewinding is performed by its reverse rotation, there has already been known a proposal for changing over the driving power transmitting system midway on the film rewinding direction so that the reverse rotating output of the above motor is utilized in driving the photographic lens. In such a camera, however, it is required to perform a changing over operation for changing over the transmitting system. Therefore, the manageability is not good. Also, changing-over force generating means of high price, such as an electromagnet for changing over that transmitting system when the above changing-over operation is performed, is necessarily used. This leads to a camera of high cost.

SUMMARY OF THE INVENTION

With the foregoing circumstances in mind, the present invention has been made, and its object is to provide a driving power transmitting device for a camera capable, in a simple form of construction, of branchingly transmitting the driving power of a motor to each mechanism of the camera.

To this end, the present invention has a feature that there are provided a motor; a first driving member to be moved by the driving power of the motors, first transmitting means for engaging with the first driving member when the first driving member moves in a prescribed direction by a prescribed distance, and to change the path of transmission of the driving power of the motor by that engagement; a second driving member to be moved by the driving power of the motor; follow-up member for following the second driving member in delay, and second transmitting means for changing the path of transmission of the driving power of the motor when the follow-up member has caught up to the second driving member as the second driving member has stopped.

Other objects of the invention will become apparent by the preferred embodiments shown below.

BRIEF DESCRIPTION OF THE DRAWINGS

FIG. 11 is a view of the construction of the mechanisms illustrating another embodiment of the invention.

DETAILED DESCRIPTION OF THE PREFERRED EMBODIMENTS

Figure 1:
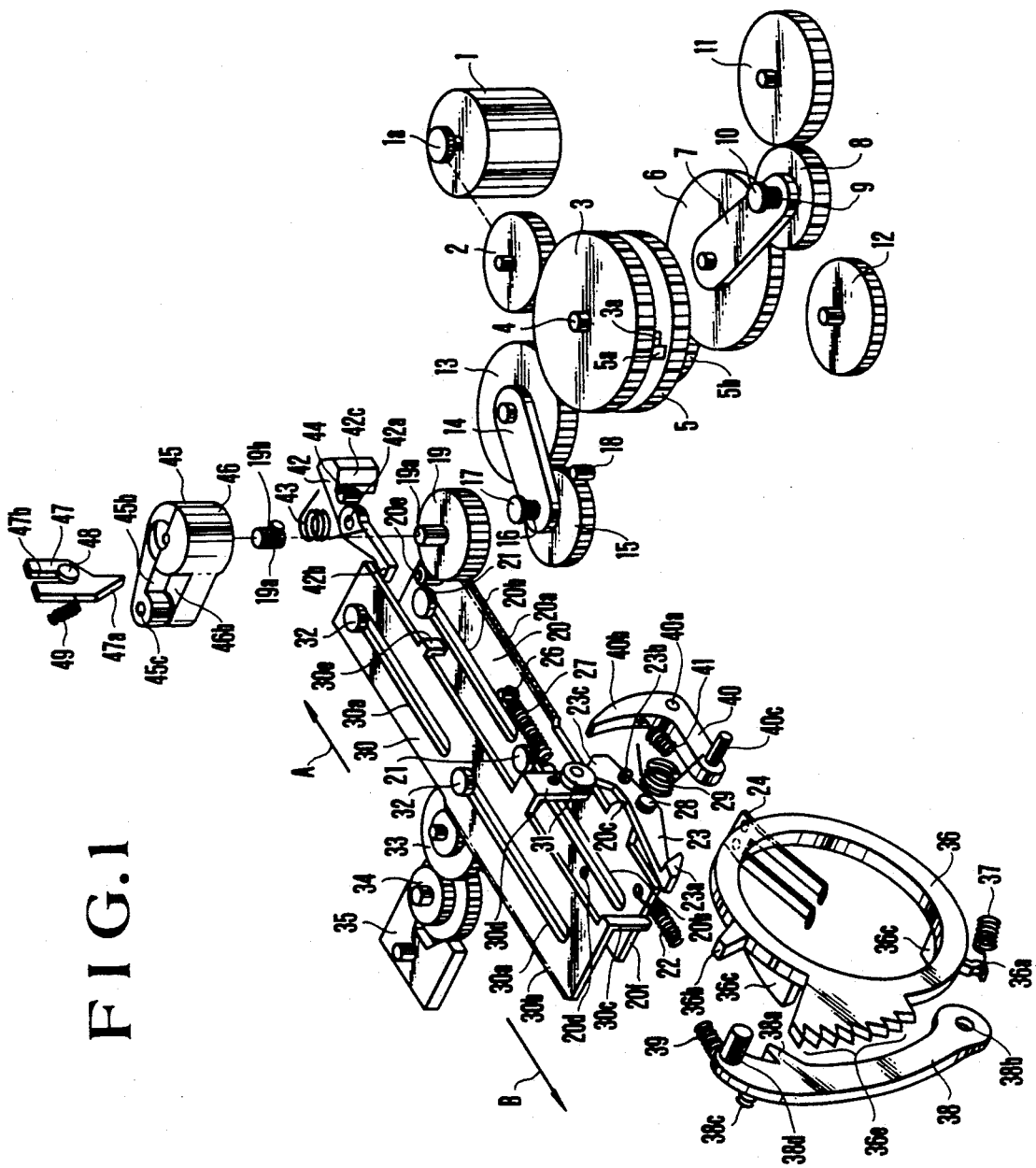
FIG. 1 is an exploded perspective view of the mechanisms of an embodiment of the camera according to the invention.

In the following, the present invention is described in detail on the basis of embodiments illustrated in the drawings.

FIGS. 1 to 6 illustrate the construction and arrangement of the parts of the mechanisms of one embodiment of the invention. It should be noted that in FIGS. 1 to 6, some of the parts are depicted as shifted in positional relationship so as to better understand their structure. A pinion 1a is fixedly mounted on an end of a rotation shaft of a motor 1 for the purpose of transmitting the output generated by the motor 1 through a speed reduction gear train (not shown) to a gear 2. A gear 3 is rotatable about a shaft 4 in a state of meshing with the gear 2 and a sun gear 13 and has an output transmitting portion 3a on the lower surface thereof to transmit the output to a gear 5. The gear 5 is rotatable about the shaft 4 independently of the gear 3, and has a projected portion 5a on the upper surface thereof to abut on the output transmitting portion 3a of the gear 3, and a small gear portion 5b on the lower surface thereof to mesh with a sun gear 6. As is understandable from FIG. 1, the arrangement is such that during the time when the gear 3 rotates nearly one revolution in a counterclockwise direction, its output transmitting portion 3a does not strike the projected portion 5a, and, because the output of the gear 3 is not transmitted, the gear 5 does not rotate during that time.

The sun gear 6 meshing with the small gear portion 5b of the gear 5 constitutes a planetary gear mechanism together with a planetary gear 8 supported by an arm 7 to be revolvable around the sun gear 6, a friction spring 9 for producing a proper friction torque so as to hinder revolution of the planetary gear 8 on its axis, and a spring washer 10. When the sun gear rotates in the counterclockwise direction, the planetary gear 8 revolves around the sun gear 6 in the counterclockwise direction to engage with a windup gear 11 (see FIG. 1). When in this state, the output of the sun gear 6 is transmitted through the planetary gear 8 and the windup gear 11 to a spool (not shown), initiating a winding-up of film. Conversely, when the sun gear 6 rotates in a clockwise direction, the planetary gear 8 revolves around the sun gear 6 in the clockwise direction to engage with a rewind gear 12 (see FIG. 5). When in this state, the output of the sun gear 6 is transmitted through the planetary gear 8 and the rewind gear 12 to a fork (not shown), initiating a rewinding of the film.

The sun gear 13 meshing with the gear 3 constitutes, similarly to the above, a planetary gear mechanism together with a planetary gear 15 supported by an arm 14 to be revolvable around the sun gear 13, a friction spring 16 and a spring washer 17. When the sun gear 13 rotates in clockwise direction, the planetary gear 15 revolves around the sun gear 6 in clockwise direction to engage with a gear 19 (the state of FIG. 2). Conversely, when the sun gear 13 rotates in the counterclockwise direction, the planetary gear 15 around the sun gear 13 revolves in the counterclockwise direction and stops in a position where it abuts on a stopper 18 (the state of FIG. 1).

The gear 19 is to transmit the output of the planetary gear 15 to a set lever 20, and is rotatable about a shaft 19a. A cam pin 19b, provided on the top end of the shaft 19a, fits in a helix member 45, 46. The set lever 20 is driven by the transmission of the output of the gear 19 to a rack portion 20a to move in a direction of arrow A by the action of long slots 20b, with structure members 21 fitted in the long slots 20b, performing a distance adjusting operation and an exposure operation by a slide lever 30 and a latch pawl 23. Usually, because of being urged by a spring 22 in a direction of arrow B (see FIG. 1), the set lever 20 stops in the state of FIG. 1 where it abuts on a stopper (not shown). Also, the set lever 20 is provided with a bent portion 20c on which the latch pawl 23 is mounted, a hole 20d with at which a pulse contact 24 for generating a pulse signal for indicating the moved position of the set lever 20 is rivetted, and an adjusting pin 20e. Further, a pin 26 for holding one end of a spring 27, having a role of causing the slide lever 30 to follow up the movement of the set lever 20, is mounted on the set lever 20. It should be noted that the set lever 20 completes a movement from the state of FIG. 1 to the state of FIG. 5 by about a ⅓ revolution of the gear 3 in the counterclockwise direction.

The latch pawl 23 is rotatably supported on the bent portion 20c of the set lever 20 by a shaft 28 and is always urged by a spring 29 in the counterclockwise direction. In FIG. 1, because of being pressed by a release pin 31 provided on the slide lever 30, it stops in a clockwise rotated position. In the state where the depression by the release pin 31 is released, it stops in the position of FIG. 2, where it abuts on a stopper (not shown). Also, the latch pawl 23 is provided with a pawl portion 23a to engage a charge portion of a distance ring to be described later in the state of FIG. 2, a spring hook portion 23b to which one end of the spring 29 is connected, and a release portion 23c, of a trapezoid shape, to be pressed by the release pin 31, as has been described above.

The slide lever 30 is urged by the spring 27 to follow the movement of the set lever 20 to move in direction of arrow A by the action of long slots 30a with structure members 32, and is operatively connected to a publicly known governor mechanism, comprising a gear 33 in mesh with its portion 30b, an escape wheel 34 and an anchor 35 so that the slide lever 30 moves at a slower speed than that of movement of the set lever 20. Also, the slide lever 30 is provided with a bent portion 30c which abuts on the end surface 20f of the set lever 20, another bent portion 30d for holding the release pin 31 and the other end of the spring 27, and a latch portion 30e or abutting a pawl portion 42b of a latch pawl 42.

Figure 2:
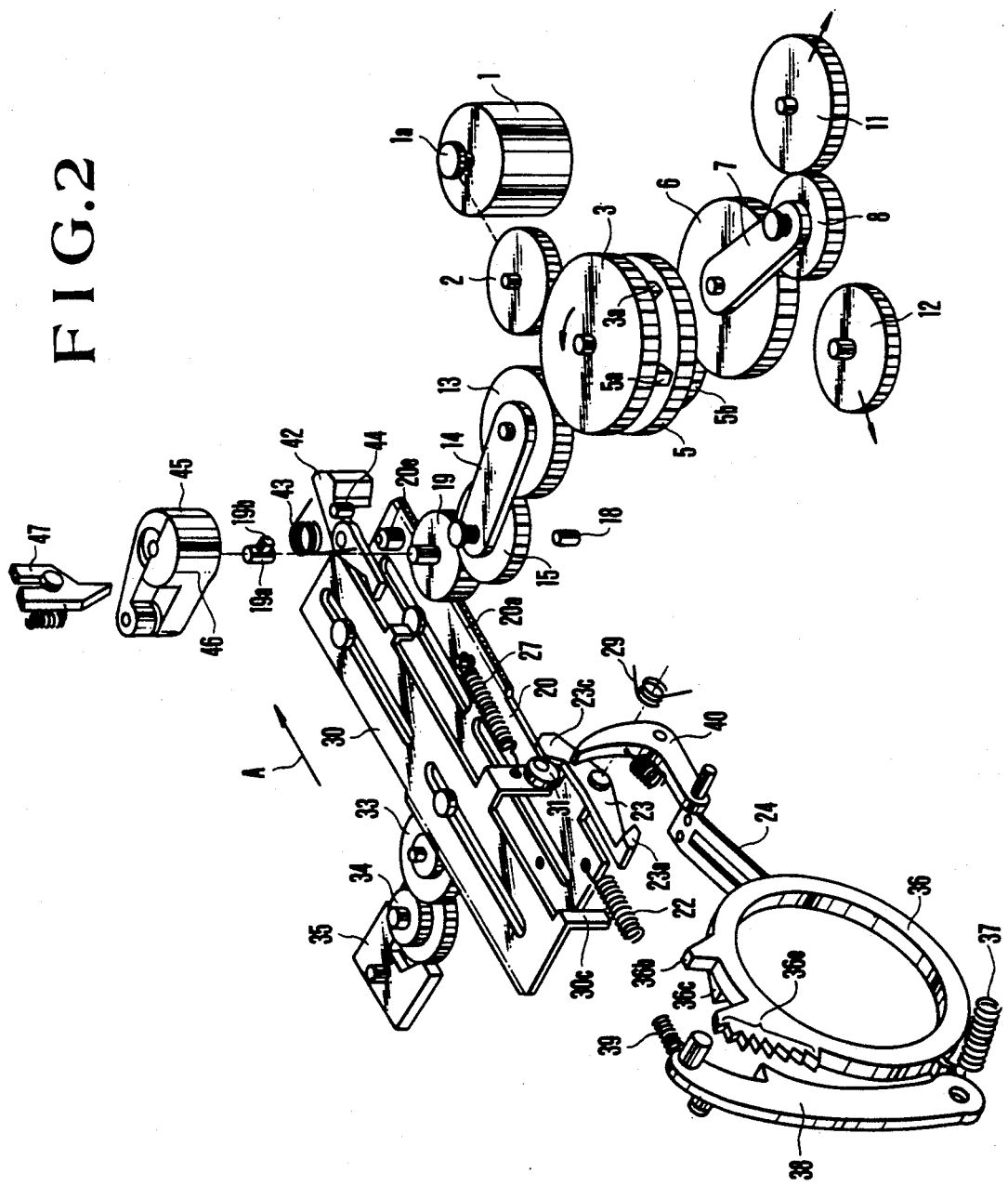
FIG. 2 is similar to FIG. 1, illustrating the relationships of the positions of the various parts during the distance adjusting operation.
Figure 3:
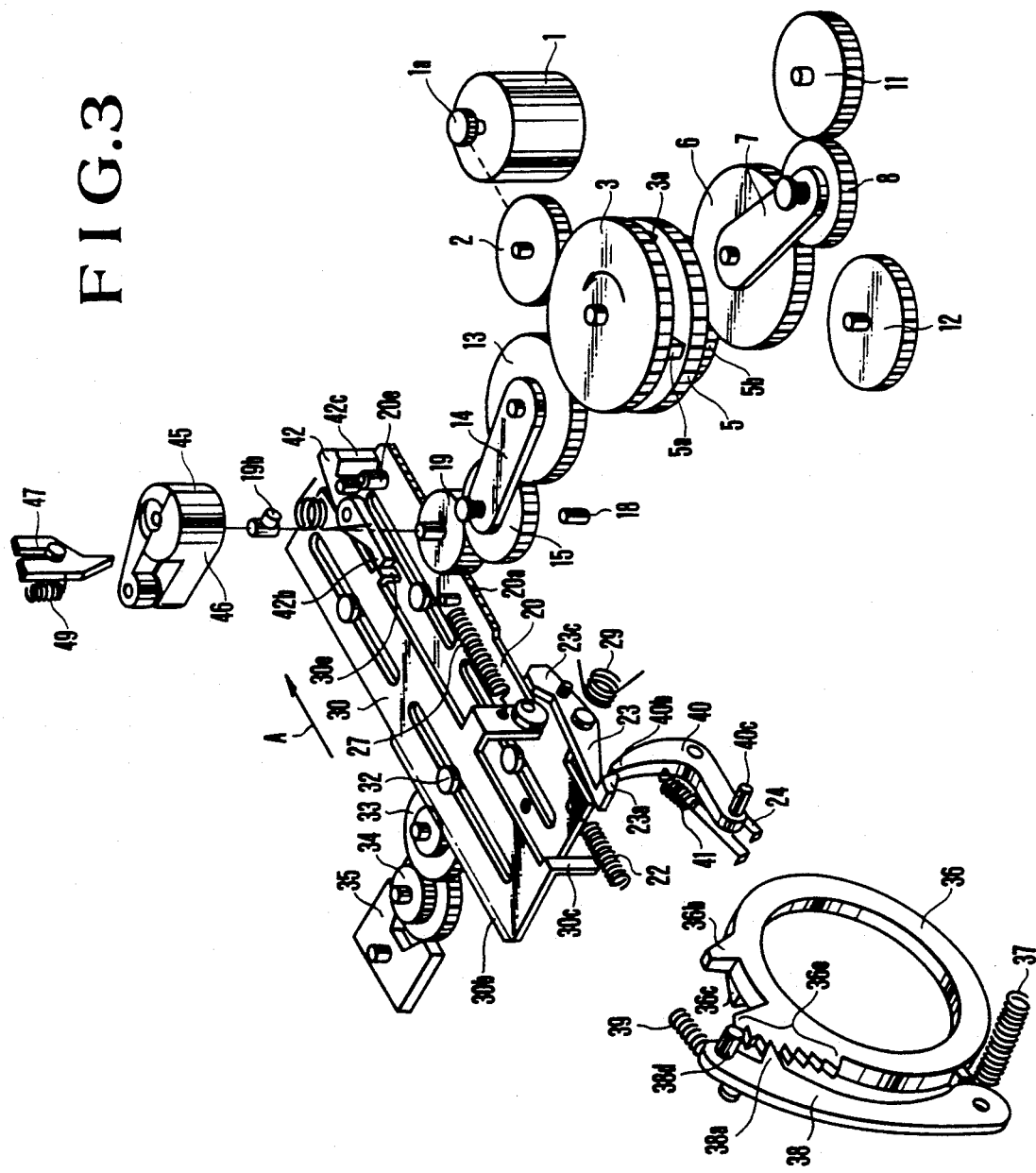
FIG. 3 is similar to FIG. 1, illustrating the relationships of the positions of the various parts at the time of start of an exposure operation.
Figure 4:
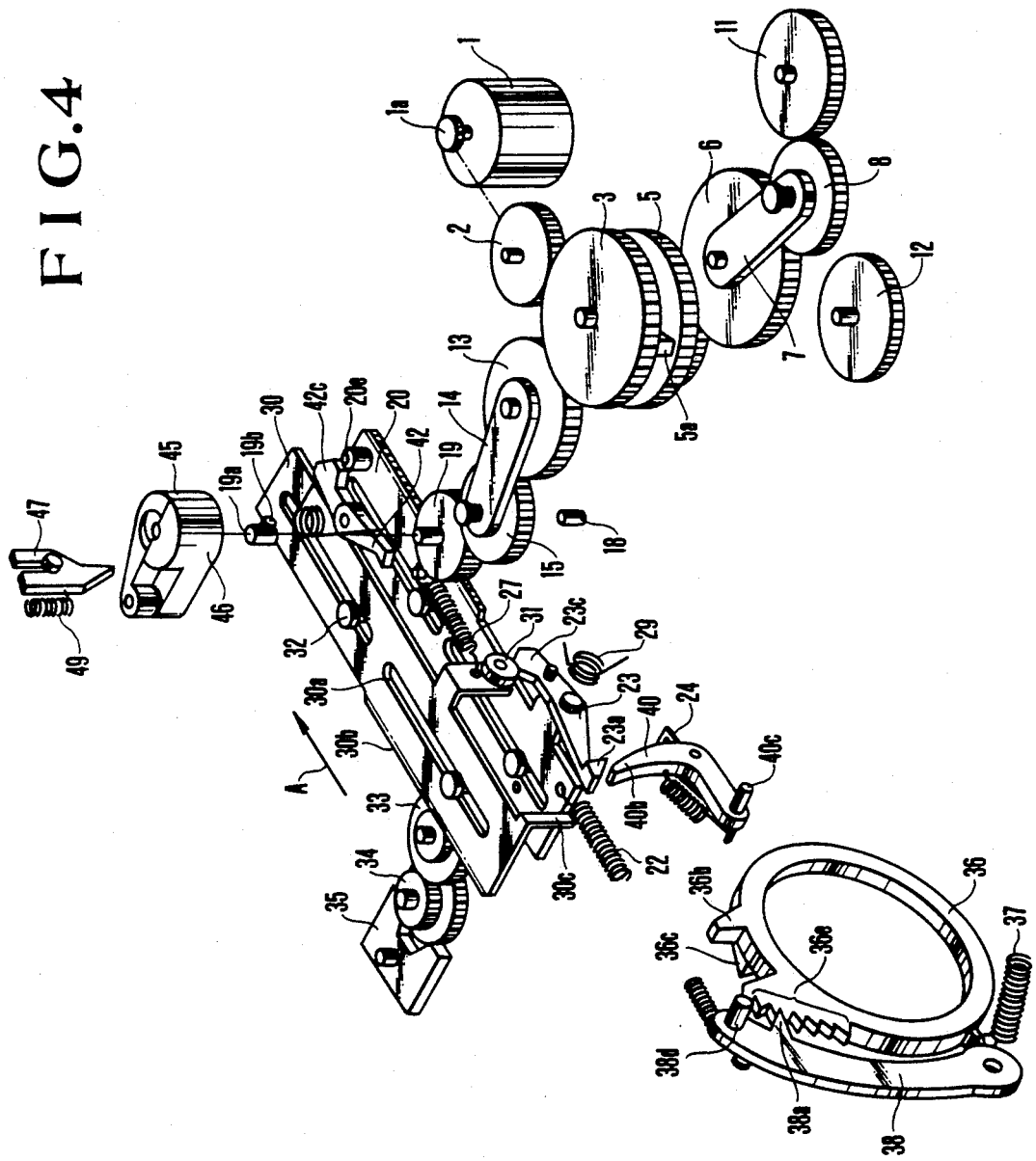
FIG. 4 is similar to FIG. 1, illustrating the relationships of the position of the various parts at the time of termination of the exposure.

The distance ring 36 is rotatably supported by a base plate (not shown), and usually stops in the state of FIG. 1 where it abuts on a stopper (not shown) because it is urged in a counterclockwise direction by a spring 37 whose one end is connected to a spring hook portion 36a of the distance ring 36. Also, in the state that the set lever 20 has move direction of arrow A as the gear 19 has rotated, the distance ring 36 rotates in the clockwise direction as shown in FIGS. 2 and 3 against the bias force of the spring 37 by a charge portion 36b in engagement with the pawl portion 23a of the latch pawl 23. At this time, a lens barrel (not shown) is axially moved forward, as guided by a lead cam 36c, and focusing of the photographic lens is performed. The distance ring 36 is provided with a toothed portion 36e to engage with a pawl portion 38a of a latch pawl 38.

The latch pawl 38 is pivotally mounted on a structure member (not shown) fitted in a hole portion 38b, and is always urged in a clockwise direction by a spring 39 whose one end is held to a spring hook portion 38c. But in the state of FIG. 1, its pin portion 38d abuts on the bent portion 30c of the slide lever 30 so that it stops in that position. In FIGS. 2 to 5, because the slide lever 30 is in the moved state in the direction of arrow A, the latch pawl 38 turns in the clockwise direction, by the bias force of the spring 39, to engage with any one of the teeth 36e to hinder counterclockwise rotation of the distance ring 36.

A blade-opening lever 40 for performing opening-closing of shutter blades (not shown), is rotatably held about a hole portion 40a, and is always urged in a counterclockwise direction by a spring 41. In FIG. 1, it is urged in the counterclockwise direction by the spring 41 until a position where it abuts on a stopper (not shown). When in this state, the shutter blades are closed. Also, in the progress of movement of the set lever 20 in the direction of arrow A, the blade-opening lever 40 turns in a clockwise direction (the state of FIG. 3) by the pawl portion 23a of the latch pawl 23 in engagement with a pawl portion 40b. At this time, the shutter is opened by the action of a pin portion 40c. A latch pawl 42 is pivotally held about a hole portion 42a and is urged always in a clockwise direction by a spring 43. But in FIG. 1, it abuts on a stopper 44 and stops in that position. Also, the latch pawl 42 is provided with a pawl portion 42b to engage with the latch portion 30e of the slide lever 30 to once stop the movement of the slide lever 30, and a cam portion 42c to release the latching state of the latch portion 30e and the pawl portion 42b along with the adjusting pin portion 20e of the set lever 20.

Figure 5:
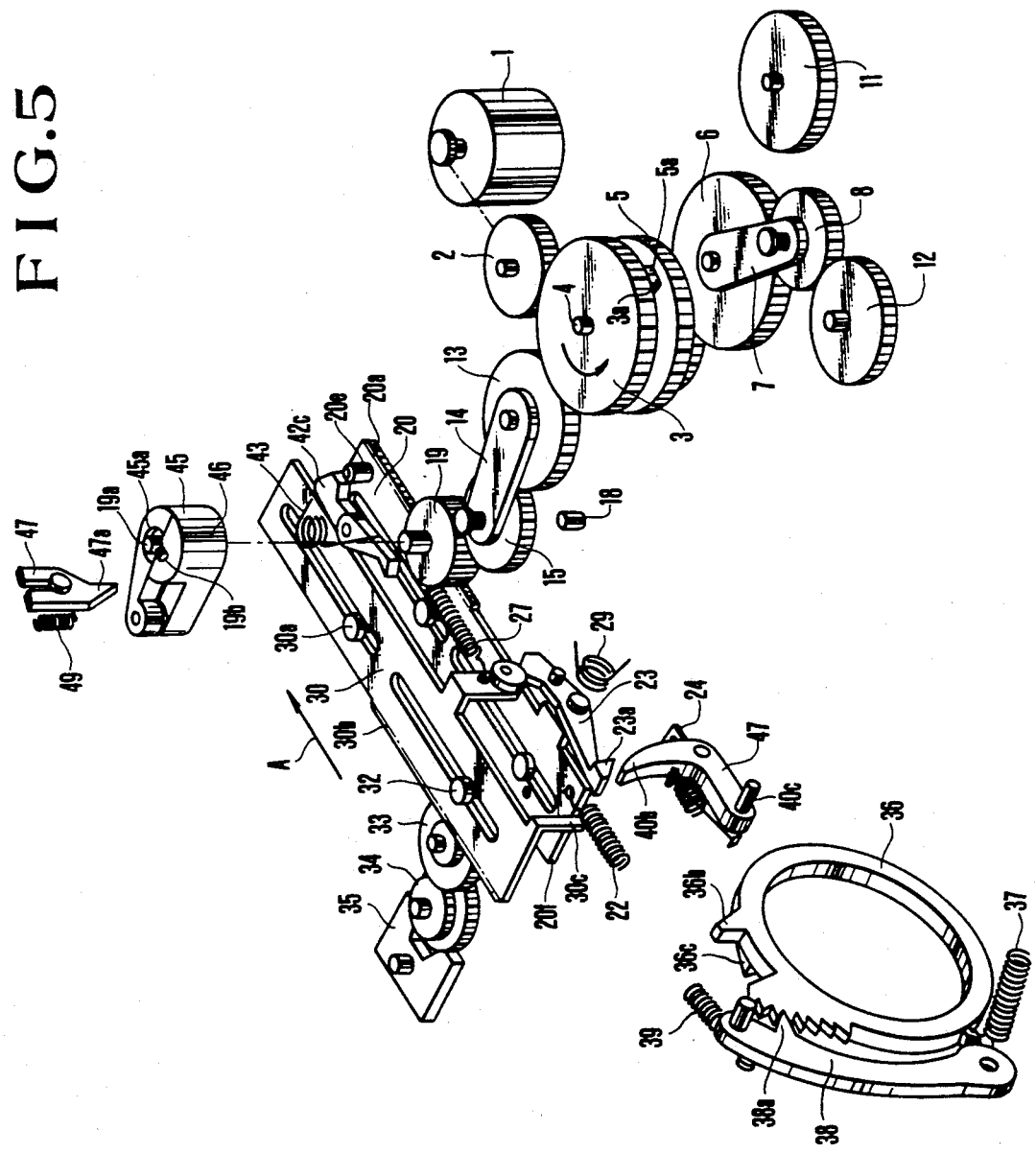
FIG. 5 is similar to FIG. 1, illustrating the relationships of the positions of the various parts at the time of film rewinding.
Figure 6:
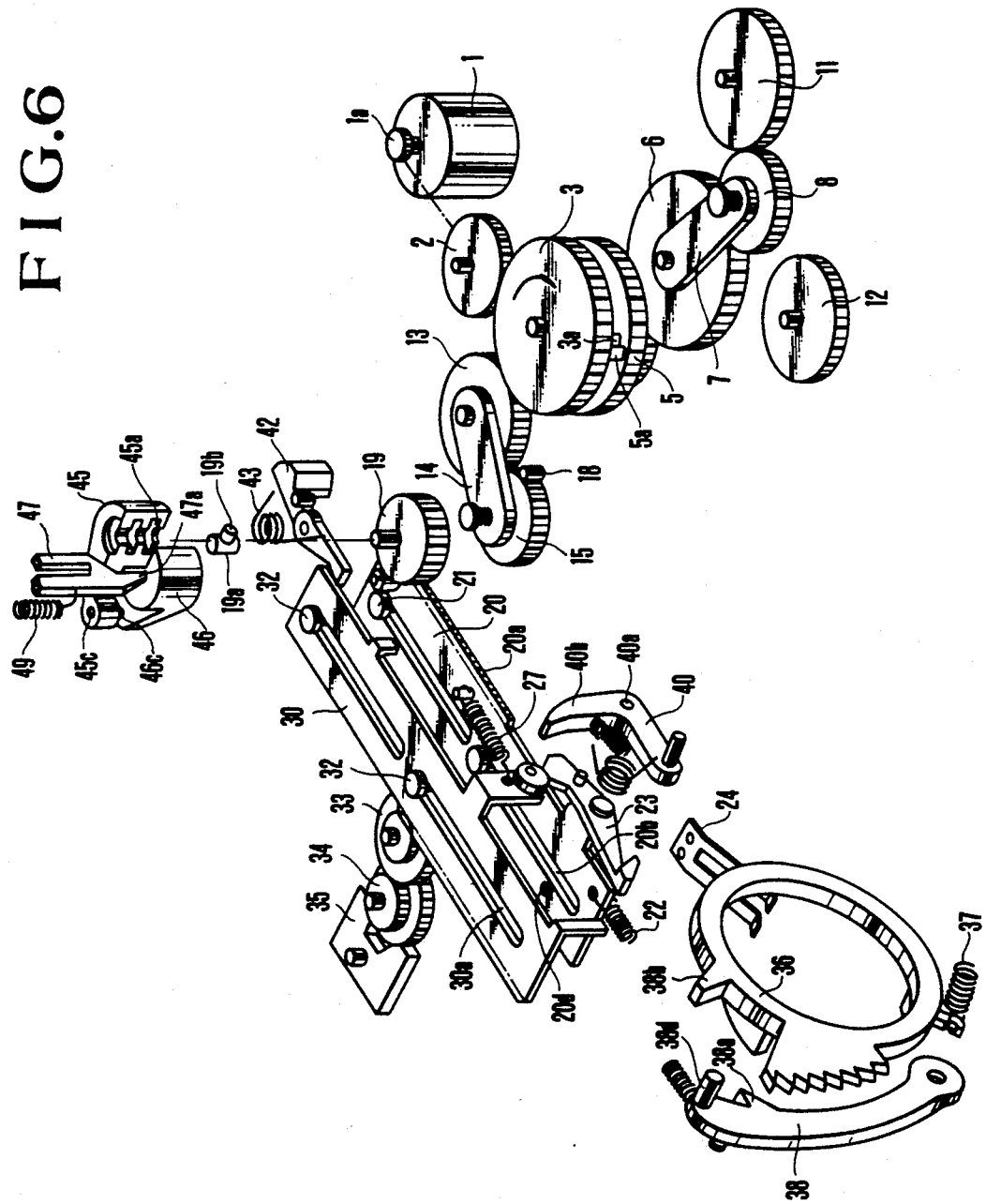
FIG. 6 is similar to FIG. 1, illustrating the relationships of the positions of the various parts when a back cover opening-closing operation is performed.

The helix members 45, 46 are urged by a spring (not shown) in a direction to draw close to each other. Because one of the helix members, or the helix member 45, stops by a stopper (not shown), the other helix member 46 abuts on the helix member 45 so that the positional relationship of FIG. 1 is maintained. Helical grooves 45a and 46a (the groove 46a is not shown), for fittingly holding the cam pin 19b of the gear 19, are formed in the helix members 45 and 46 as shown in FIG. 6. Their arrangement is such that when the gear 19 rotates in the clockwise direction, because the cam pin 19b gradually moves upward as guided by the grooves 45a and 46a, the gear 19 moves upward against the bias force of a spring (not shown) for holding the gear 19 in such a state as in FIG. 1 and gets out of engagement with the rack portion 20a of the set lever 20 when it has rotated about two revolutions (the state of FIG. 5). Also, at this time, the cam pin 19b protrudes over the upper surface of the helix members 45 and 46 as shown in FIG. 5, and, therefore, it no longer moves upward beyond this. Also, recessed portions 45b and 46b (see FIG. 1) are formed in parts of the confronting portions of the helix members 45 and 46 so as to make a somewhat gap. As a pawl portion 47a of a reset lever 47 comes to insert into the recessed portions 45b and 46b, the helix members 45 and 46 turn about hole portions 45c and 46c in a direction to depart from each other (see FIG. 6), so that the cam pin 19b slips out of the interior of the helix members 45 and 46. Thereby, the gear 19 becomes again in the engaged state with the rack portion 20a as in FIG. 1.

The reset lever 47 is arranged to be vertically slidable by the action of long slots 47b and pins 48 in response to an opening-closing operation of a back cover (not shown) and is usually (when the back cover is closed) positioned in the state of FIG. 1 because it is urged upward by a spring 49. Also, when the opening operation of the back cover is performed, the reset lever 47 slides downward against the bias force of the spring 49 as shown in FIG. 6. At this time, its pawl portion 47a inserts in between the recess portions 45b and 46b, causing the gear 19 and the rack portion 20a to return to the meshing state with each other as has been described above.

Figure 7:
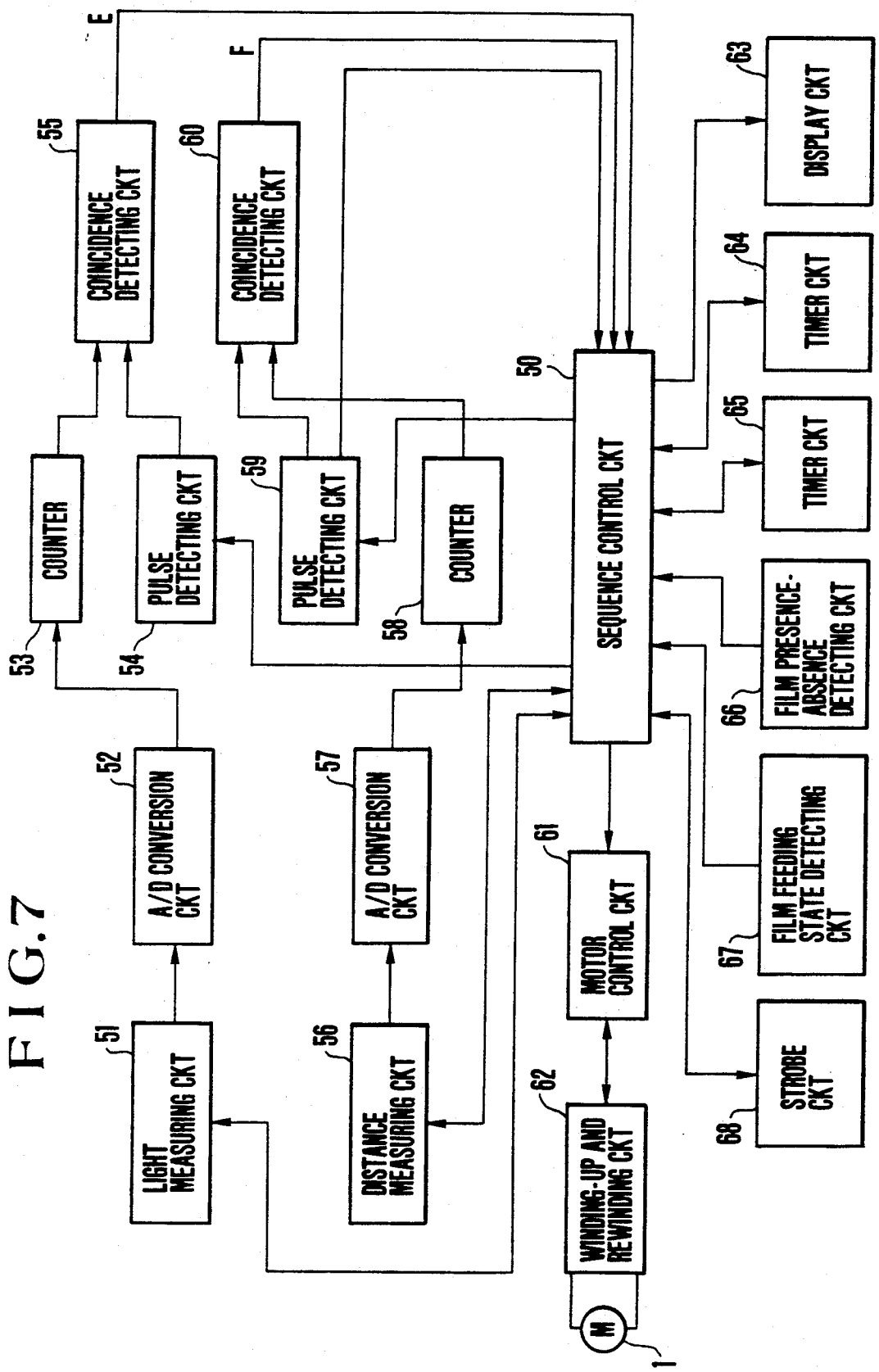
FIG. 7 is a block diagram of the camera of FIG. 1.

FIG. 7 is a block diagram for performing the drive control of the above-described each member. 50 is a sequence control circuit comprising a micro-computer and others for governing the control of each circuit; 15 is a publicly known light measuring circuits; 52 is an A/D conversion circuit for converting the measured light information from the light measuring circuit 51 to a digital signal; 53 is a counter for holding the digital value from the A/D conversion circuit 52; 54 is a pulse detecting circuit for detecting the number of pulses produced by the pulse contact 24 and a pulse plate (not shown) by the movement of the set lever 20 during the time when an exposure operation is performed; 55 is a coincidence detecting circuit for comparing the digital value (EV value) from the counter 53 with the pulse number from the pulse detecting circuit 54 which upon detection of coincidence, produces a coincidence signal E for the sequence control circuit 50; 56 is a publicly known distance measuring circuit; 57 is an A/D conversion circuit for converting the measured distance information from the distance measuring circuit 56 to a digital signal; 58 is a counter for holding the digital value from the A/D conversion circuit 57; 59 is a pulse detecting circuit having a similar function to that of the pulse detecting circuit 54 for detecting the number of pulses, or the like, produced by the pulse contact 24 and a pulse plate (not shown) by the movement of the set lever 20 during the time when a distance adjusting operation is performed; 60 is a coincidence detecting circuit for comparing the digital value from the counter 58 with the pulse number from the pulse detecting circuit 59 which, upon detection of coincidence produces a coincidence, signal F.

61 is a motor control circuit for controlling the normal and reverse rotation of the motor 1; 62 is a winding-up and rewinding circuit for supplying current to the motor 1 in the film winding-up direction or the film rewinding direction depending on the signal from the motor control circuit 61; 63 is a display circuit for causing each information obtained by the light measuring circuit 51 and the distance measuring circuit 56 to be displayed in a finder; 64 is a timer circuit in which the time, for the purpose of hindering the current supply to the motor 1 during the time from the stoppage of the set lever 20 in a first or second position, or the like, (the details will be described later) at which position the slide lever 30 then arrives to the complete end of the distance adjusting operation, or the exposure operation, or the like, is determined; 65 is a timer circuit for detecting the tensioning state of the film; 66 is a film presence-absence detecting circuit corresponding to the publicly known film presence-absence switch for detecting whether or not the film is present in a confronting position to an aperture; 67 is a film feeding state detecting circuit corresponding to the publicly known sprocket switch for detecting the feeding state of film; 68 is a publicly known strobe circuit.

Figure 8:
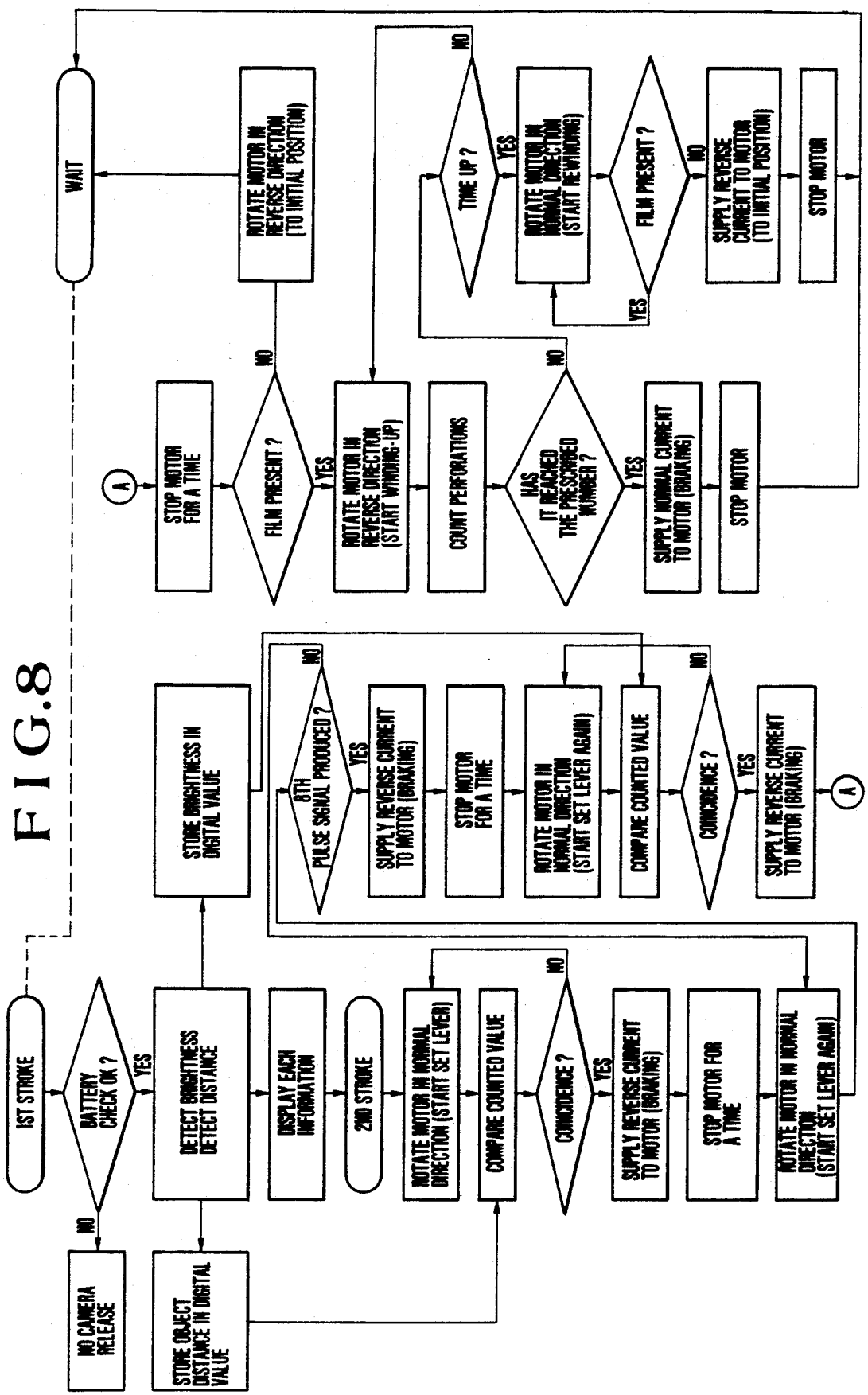
FIG. 8 is a flowchart of the camera of FIG. 1.
Figure 9:
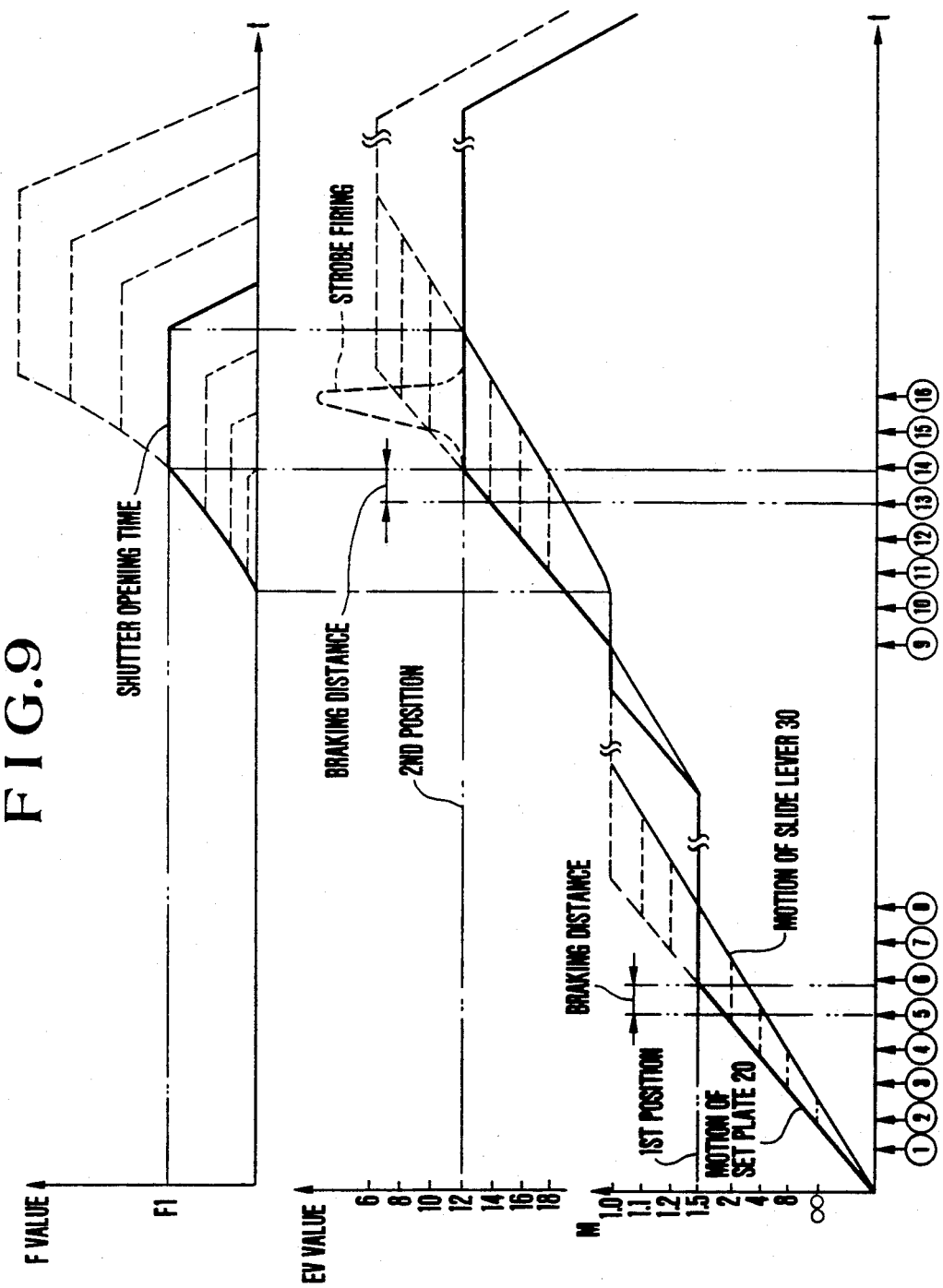
FIG. 9 is a graph to explain the times of the distance adjusting operation and exposure operation of the camera of FIG. 1.

Next, while referring to FIG. 9, we explain the operation according to the flowchart of FIG. 8. When the photographer pushes a release button (not shown) to a first stroke, the sequence control circuit 50 commands a battery-checking circuit, which is publicly known, to check the actual voltage of the battery. If the result is that the battery voltage is sufficiently high to perform a sequence of photographic operations, an actuating signal is outputted from the sequence control circuit 50 to the light measuring circuit 51. An object brightness then starts to be detected by the light measuring circuit 51. After that, when a light measurement completion signal is generated by in the light measuring circuit 51, another actuating signal is outputted from the sequence control circuit 50 to the distance measuring circuit 56. A distance to an object to be photographed starts to be detected by the distance measuring circuit 56. The thus-obtained light and distance informations are not only stored in a memory portion of the sequence control circuit 50, but also sent to the A/D conversion circuits 52 and 57 where they are converted to respective digital signals which are then applied to the counters 53 and 58, respectively. Also, each information stored in the memory portion of the sequence control circuit 50 is displayed in the finder through the display circuit 63. Also, when the measured light information obtained by the light measuring circuit 51 is lower than a prescribed EV value (the object is dim), a strobe-charging start signal is outputted from the sequence control circuit 50 to the strobe circuit 68.

After the informations displayed in the finder, as has been described above, have each been examined, when the photographer further depresses the release button to the second stroke, a command signal representing the normal rotation of the motor is outputted from the sequence control circuit 50 to the motor control circuit 61, and the motor 1 starts to rotate in the forward direction. Its output is transmitted through the gear 2 to the gear 3, so that the gear 3 and the sun gear 13 start to rotate in the counterclockwise and clockwise directions, respectively. Also, by the rotation of the sun gear 13 in the clockwise direction, the planetary gear 15 revolves around the sun gear 13 in the clockwise direction under the action of the sun gear 13 and others, coming to engage with the gear 19 and rotating the gear 19 in the clockwise direction.

When the gear 19 rotates in the clockwise direction, because its output is transmitted to the rack portion 20a, the set lever 20 starts to move in the direction of arrow A against the bias force of the spring 22. Thereby, because the abutment of the end surface 20f of the set lever 20 and the bent portion 30c of the slide lever 30 is removed, the slide lever 30 also wants to move by the urging force of the spring 27 generated in accompaniment with the movement of the set lever 20 at an equal speed. But, because the slide lever 30 is operatively connected to the governor mechanism, comprised of the gear 33, the escape wheel 34 and the anchor 35, it starts to move at a slower speed than the set lever 20 does as shown in FIG. 9.

When the phase of the set lever 20 and the slide lever 30 slightly deviates from the positional relationship of FIG. 1, the abutment of the release pin 31 and the release portion 23c of the latch pawl 23 is removed, the latch pawl 23 turns in the counterclockwise direction under the action of the spring 29 until it abuts on a stopper (not shown) or such a position as shown in FIG. 2 is reached. Thereby, the pawl portion 23a of the latch pawl 23 and the charge portion 36b of the distance ring 36 engage each other. With such an attitude of the latch pawl 23, when the set lever 20 further moves, the pawl portion 23a of the latch pawl 23 latches the charge portion 36b of the distance ring 36, and rotates the distance ring 36 against the bias force of the spring 37 in the clockwise direction as shown in FIG. 2.

Also, in the progress of movement of the set lever 20 in the direction of arrow A, as has been described above, a pulse signal is generated (see FIG. 9) by the pulse contact 24 mounted to its lower portion and the pulse plate (not shown). This pulse signal is detected by the pulse detecting circuit 59, and outputted in sequence to the coincidence detecting circuit 60. By the coincidence detecting circuit 60, it is compared with the digital value from the counter 58. After that, when the fact that coincidence has taken place is detected by the coincidence detecting circuit 60, a coincidence signal F is outputted to the sequence control circuit 50. Thereby reverse current is supplied to the motor 1 and the motor 1 is rapidly stopped. By the foregoing it results that the set lever 20 has moved to a first position based on the measured distance information obtained from the distance measuring circuit 56. For example, suppose the above-described distance information is 1.5 m, then, at a point in time when a pulse of ⑤ shown in FIG. 9, or the 5th pulse signal is generated, the reverse current is supplied to the motor 1, and the motor 1 is rapidly stopped so that the set lever 20 stops in a position corresponding substantially to the above-described value of 1.5 m. It should be noted that, as shown in FIG. 9, the braking distance of the set lever 20 for this time is anticipated such that the set lever 20 moves to a position just before the next (6th) pulse signal is produced. Also, even if the set lever 20 has stopped in such a state, the set lever 20 does not move in the direction of arrow B by the power of the spring 22 due to the friction of the gear train including the motor 1.

After that, as the slide lever 30 delays in moving, when it reaches the first position in which the set lever 20 is stopping, the release portion 23c of the latch pawl 23 is pushed downward by the release pin 31 mounted to its bent portion 30d, thereby the engagement of the charge portion 23a and the pawl portion 36b of the distance ring 36 is released. When the engagement of the latch pawl 23 with the distance ring 36 is released in such a manner, the distance ring 36 wants to turn in the counterclockwise direction by the power of the spring 37. But, at this time, the engagement with the latch pawl 38, which has turned in the clockwise direction in the state of its pin portion 38d abutting on the bent portion 30c of the slide lever 30 by the action of the spring 39 in accompaniment with the movement of the slide lever 30, becomes such a state as shown in FIG. 3, that is, a state that the pawl portion 38a has entered the root of the 5th of the toothed portion 36e. Therefore, the distance ring 36 remains stationary in such a state as sown in FIG. 3 and does not move in the counterclockwise direction. Depending on such an amount of rotation of the distance ring 36, the forward axial movement of the photographic lens (not shown) is adjusted. Thus, the focusing of the photographic lens, or the distance adjusting operation completes.

When the time, sufficiently long to complete such operation as has been described above, has elapsed, or the timer required from the steppage of the set lever 20 in the first position to the forward axial movement of the photographic lens till the position depending on the measured distance information of that time has elapsed, the timer circuit 64 times up and a command signal for the normal rotation of the motor is again outputted from the sequence control circuit 50 to the motor control circuit 61. Then, the motor 1 starts to rotate in the normal direction. When the motor 1 starts to rotate in the normal direction in such a manner, its output is, as has been described above, transmitted through the gear 2, the gear 3, the sun gear 13, the planetary gear 15 and the gear 19 to the rack portion 20a of the set lever 20, and the set lever 20 starts to further move from the above first position in the direction of arrow A. After that, when an 8th pulse signal is detected by the pulse detecting circuit 59, the sequence control circuit 50 again causes reverse current supply to the motor 1, causing the set lever 20 to stop. The set lever 20 stops for a time sufficient for the slide lever 30 to catch up. When the timer circuit 64 times up, a command signal for the normal rotation is outputted from the sequence control circuit 50 to the motor control circuit 61, and the set lever 20 starts to move in the direction of arrow A again. Meanwhile, the slide 30 remains stopped in the position where it caught up the set lever 20, because its bent portion 30e engages with the pawl portion 42b of the engagement pawl 42.

When a phase difference is formed between the set lever 20 and the slide lever 30 by the movement of the set lever 20 in the direction of arrow A, the release pin 31 and the release portion 23c of the latch pawl 23 are taken out of abutment, and the latch pawl 23 turns in the counterclockwise direction so that the pawl portion 23a of the latch pawl 23 and the pawl portion 40b of the blade opening lever 40 become engageable. With the latch pawl 23 of such attitude, when the set plate 20 further moves, the pawl portion 23a of the latch pawl 23 engages the pawl portion 40b of the blade opening lever 40 and turns the blade opening lever 40 against the bias force of the spring 41. After that, when the set lever 20 moves to a prescribed position, the slide lever 30 is released from the above engagement, because the cam portion 42c of the engagement pawl 42 is pushed by the adjusting pin portion 20e. Then, it starts to move again, following up the set lever 20. That the engagement pawl 42 is arranged as has been described above is from the reason that the exposure time does not vary by the distance adjusting position, also from the reason that as, when the object at a distance of 1.0 m that is the minimum photographable distance this camera has it photographed, the shutter operation starts immediately after the distance adjusting operation ends as has been described above, the instability of the rising characteristic of the motor 1 at the time of start of the shutter operation in such a case is eliminated, and, from the aim that the shutter operation is made to start in the state that there is a phase difference between the set lever 20 and the slide lever 30.

Also, similar to what has been described above, in the progress of movement of the set lever 20 in the direction of arrow A, a pulse signal is produced by the contact 24 mounted on the lower portion thereof and the pulse plate (not shown) (see FIG. 9). This pulse signal is detected by the pulse detecting circuit 54 and outputted, in sequence, to the coincidence detecting circuit 55 by which it is compared with the digital value from the counter 53. After that, when the fact that they have coincided with each other is detected by the coincidence detecting circuit 55, the coincidence signal E is outputted to the sequence control circuit 50. Thereby, reverse current is supplied to the motor 1, and the motor 1 stops rapidly. By the above, it becomes that the set lever 20 has moved to the second position based on the measured light information obtained by the light measuring circuit 51. For example, suppose the above-described light information (object brightness) is EV12, the reverse current supply to the motor 1 is carried out at a time when a pulse of ⑬ or a 13th pulse signal has been generated as shown in FIG. 9. When the motor 1 is rapidly stopped, the set lever 20 stops in a position corresponding to substantially the above described EV12. At this time, the blade opening lever 40, turned in the clockwise direction by the pawl portion 23a of the latch pawl 23, stops in a state that the shutter (not shown) is opened to an aperture of F1 as in FIG. 9. By this, an exposure to the film plane is performed.

By the way, supposedly, in a case when the measured light information obtained by the light measuring circuit 51 is judged to be lower than a prescribed brightness by the sequence control circuit 50, in a short time from the stoppage of the set lever 20, a strobe firing signal is outputted from the sequence control circuit 50 to the strobe circuit 68, and a strobe firing (see FIG. 9) is carried out. It should be noted that the fact that the strobe is fired when the aperture opening is stable as in FIG. 9 enables flash photography of good exposure accuracy to be expected.

After that, when the slide lever 30 arrives late to the second position where the set lever 20 is stopping, the release portion 23c of the latch pawl 23 is pushed downward by the release pin 31 mounted on the ben portion 30d thereof as has been described above, and the engagement of the pawl portion 23a and the pawl portion 40a of the blade opening lever 40 is released. Thereby, the blade opening lever 40 turns in the counterclockwise direction by the power of the spring 41 (see FIG. 4) to close the shutter and the exposure operation ends.

The up-to-this movement of the set lever 20 is performed during the time that the gear 3 rotates about ⅔ revolutions in the counterclockwise direction. Therefore the gears of the film driving system do not move at all. In other words, this is because such an arrangement is used that the gear 5 does not rotate until the gear 3 has rotated almost one revolution so that its output transmitting portion 3a abuts the convex portion 5a.

The subsequent series of operations are put in such a sequence control as in FIG. 8 by the sequence control circuit 50 in response to a signal from the film presence-absence detecting circuit 66 or a signal presenting whether or not film is loaded. So at first, we describe about the case where no film is loaded (the case where the camera is not loaded with film, but for test, a release operation was performed and the operations till described above have ended). In this case, a signal for rotating the motor 1 in the reverse direction for a prescribed time (the time necessary for the gear 3 to rotate about ⅔ revolutions) is outputted from the sequence control circuit 50 to the motor control circuit 61, and the motor 1 starts to rotate in the reverse direction. Thereby, the gear 3 and the sun gear 13 rotate in the clockwise and counterclockwise directions, respectively, and also the planetary gear 15 revolves in the counterclockwise direction, returning again to their states of FIG. 1. Also, as has been described above, by the counterclockwise revolution of the planetary gear 15, it is taken out of engagement with the gear 19, and the set lever 20 and the slide lever 30 also return again to the states of FIG. 1 by the powers of the springs 22 and 27. At this time, because the latch pawl 23 is maintained in the clockwise turned attitude by the depression of the release pin 31, the pawl portion 23a of the latch pawl 23 does not strike the pawl portion 40b of the blade opening lever 40 and the charge portion 36b of the distance ring 36, so that it can smoothly return to the state of FIG. 1. Further, in this returning progress, the bent portion 30c of the slide lever 30 pushes the pin portion 38d of the engagement pawl 38 to gradually take the pawl portion 38a and the pawl portion 36e out of engagement. Therefore, the distance ring 36 also turns in the counterclockwise direction by the power of the spring 37, and returns again to the state of FIG. 1.

Next, the case where the film is loaded will be described. When the time required from the stoppage of the set lever 20 in the second position till the opening-closing operation of the shutter ends has elapsed, and the timer circuit 64 times up, the signal for rotating the motor 1 in the reverse direction is outputted from the sequence control circuit 50 to the motor control circuit 61, and the motor 1 starts to rotate in the reverse direction. Then, in a similar manner to that described above, the gear 3 rotates in the clockwise direction and the planetary gear 15 revolves in the counterclockwise direction, the gear 15 being taken out of engagement with the gear 19. The set lever 20 and the slide lever 30 then return to the states of FIG. 1 by the powers of the springs 22 and 27.

As the motor 1 further continues to rotate in the reverse direction, because the transmitting portion 3a of the gear 3 abuts on the convex portion 5a of the gear 5 and the output of the motor 1 becomes transmitted through the gear 3 to the gear 5, the gear 5 starts to rotate in the clockwise direction. When the gear 5 starts to rotate in the clockwise direction, the sun gear 6 rotates in the counterclockwise direction, and, in accompaniment with this, the planetary gear 8 around the sun gear 6 revolves the counterclockwise direction to engage with the windup gear 11 so that the output of the motor 1 is transmitted up to the spool for winding up. Thus, a film winding up is started. When the film winding up is started, the film feeding state detecting circuit 67 operates so that the amount of moved film is detected by the number o perforations. When the fact that the film feeding has been performed by the prescribed amount is detected by the film feeding state detecting circuit 67 until the timer circuit 65 which starts to count at the same time when the aforesaid film winding up starts times up, the signal for normal rotation of the motor 1 for a prescribed time is outputted from the sequence control circuit 50 to the motor control circuit 61, and the motor 1 then stops. Thereby, the film winding up by one frame has ended.

Also, in the case where the photographing of all frames ends so that the fact that the film has been fed by the prescribed amount is not detected by the film feeding state detecting circuit 67 despite the timer circuit 65 has timed up, in other words, when the film has become a tensional state, a signal is outputted from the sequence control circuit 50 to the motor control circuit 61 in order to rotate the motor 1 in the normal direction (film rewinding direction). Then, the set lever 20 starts to move in the direction of arrow A against the bias force of the spring 22, and, as has been described above, the distance adjusting operation and the exposure operation are carried out. After the photographic operation for one frame has been carried out, when the gear 3 further rotates in the counterclockwise direction, it is by now that the transmitting portion 3a of the gear 3 becomes to abut from the opposite side of the convex portion 5a of the gear 5 as shown in FIG. 5. Therefore, the gear 5 starts to rotate in the counterclockwise direction. When the gear 5 starts to rotate in the counterclockwise direction, the sun gear 6 rotates in the clockwise direction, and, in accompaniment with this, the planetary gear 8 revolves in the clockwise direction to engage with the gear 12 for rewinding, so that the output of the motor 1 is transmitted to the fork (not shown) to start a rewinding of film.

Meanwhile, when the motor 1 rotates in the normal direction and the gear 3 rotates in the counterclockwise direction, its output is transmitted through the sun gear 13 and the planetary gear 15 to the gear 19 so that as has been described above, the set lever 20 moves in the direction of arrow A to perform each operation. Further, when the output of the motor 1 comes to transmit to the gear 19, the gear 19 further continues to rotate in the clockwise direction. Because the cam pin 19b mounted on its top end fits in the helical grooves 45a and 45b of the helix members 45 and 46, the gear 19 gradually moves upward (see FIG. 5). When it becomes a state of meshing with the terminal end of the rack portion 20a of the set lever 20, the meshing with the rack portion 20a is taken out. In such a manner, the gear 19 and the set lever 20 are taken out of engagement. Then, the set lever 20 returns again to the state of FIG. 1 by the power of the spring 22.

After that, when the fact that the film has been fully taken up within the cartridge is detected by the film presence-absence detecting circuit 66, a signal for reverse rotation of the motor 1 is outputted from the sequence control circuit 50 to the motor control circuit 61, thereby the motor 1 rotates in the reverse direction by a prescribed amount, and each gear train returns again to the state of FIG. 1. At this time, the spool also rotates, but the film does not already convolute, so that it does not happen that the film is pulled out of the cartridge.

After the film rewinding has ended in such a manner as described above, when the photographer carries out the opening-closing operation of the back cover in order to take the film out, the reset lever 47 comes to descend in response thereto and as shown in FIG. 6 wrenches open the helix members 45 and 46. Therefore, the gear 19 drops by the power of the downward biased spring (not shown) again to the position of FIG. 1, or the position where it meshes with the rack portion 20a of the set lever 20. When the back cover is closed again, because the reset lever 47 returns upward by the power of the spring 49, the helix members 45 and return again to the state of FIG. 1.

Though, in this embodiment, linearly moving members, such as the set lever 20, the slide lever 30, or the like, have been used, these may alternatively be members rotatable about respective points. Also, as the means for transmitting the output of the gear 3 to the gear 19 and the output of the gear 4 to the windup gear 11, the rewind gear 12, use is made of the respective planetary gear mechanisms. But, they may be the publicly known one-way mechanisms utilizing balls and constrained springs or pawls. Further, as the drive source use is made of the D.C. motor. This also may be replaced by a supersonic motor using a vibrator, drive means using an electrostrictive element, or drive means utilizing a shape memory alloy.

Also, though, in this embodiment, as the drive source for moving the set lever 20 in the direction of arrow A use is made of the motor 1, a drive source solely used for the distance adjustment and the shutter may be provided, and the output of said drive source is utilized to move the set lever 20.

Figure 10:
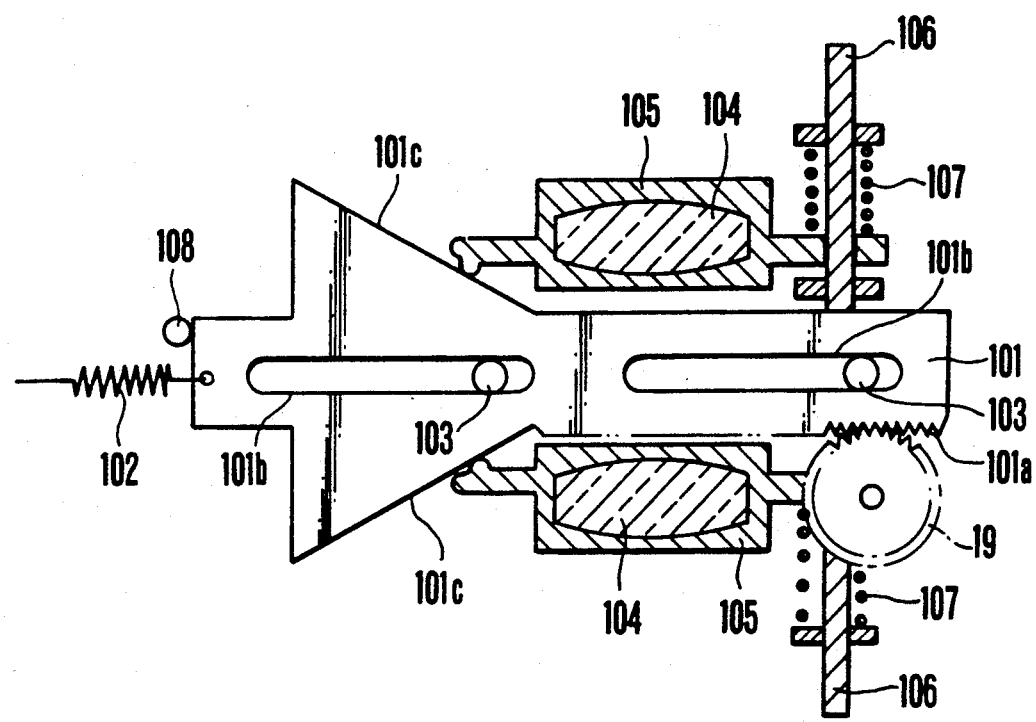
FIG. 10 is a view of the construction of the mechanism illustrating an example of variation of the invention.

Also, in this embodiment, when the output of the motor 1 is not used in winding up or rewinding the film, the output of said motor 1 is used for the distance adjusting operation and the exposure operation. But, the invention is not confined thereto, and it may be such an arrangement as to utilize it in the zooming operation or the opening-closing operation of a barrier. In FIG. 10, there is shown the outline of such arrangement of utilizing the output of the motor 1 in the above-described zooming operation. The parts similar to those shown in FIG. 1 are denoted by the same reference characters. When the gear 19 rotates in the clockwise direction, and its output is transmitted to a rack portion 101a of a set lever 101, the set lever 1 starts to move to the right as viewed in the drawing against the bias force of a spring 102 by the action of long slots 101b and structure members 103. When the set lever 101 starts to move in such a manner, a lens barrel 105 holding a zoom lens 104 moves vertically (against the bias force of a spring 107) as a holding member 106 is guided by its cam portion 101c. Thus, a zooming operation is started. Also when the gear 19 rotates in the counterclockwise direction, the set lever 101 returns by the power of a spring 102 to the initial position where it abuts on a stopper 108.

FIG. 11 shows another embodiment of the invention. A gear 201 is to transmit the normal rotation output from a motor (not shown) to a set lever 202 through a rack portion 202a, and, when the motor rotates in the reverse direction, is taken out of engagement with the rack portion 202a. The set lever 202 is urged by a spring 203 to usually abut on a stopper 204. But, by the start of rotation of the gear 201 in the clockwise direction, it starts to move to the right as viewed in the drawing under the action of the long slots 202*b* and the structure members 205. At this time, a pulse signal informing the moved position of the set lever 202 is produced by a pulse contact (not shown) and a pulse plate (not shown). A lever 206 is pivotally mounted about a shaft 207 on the set lever 202, and is always urged in a counterclockwise direction by a spring (not shown), and is provided with a pawl portion 206*a* and a trapezoidal portion 206*b*.

A slide lever 208 moves to follow up the movement of the set lever 202 by the power of a spring 209 under the action of long slots 208*a* and structure members 210. But, a publicly known governor mechanism 211 is operatively connected to its rack portion 208*b* so that it moves at a slower speed than that of the set lever 202. Also, the slide lever 208 is provided with a convex portion 208*c* to abut on the trapezoidal portion 206*b* and a bent portion 208*d* to abut on an end surface 202*c* of the set lever 202. A return lever 212 is usually urged by a spring 213 to abut on a stopper 214. But, with the lever 206 turned in the counterclockwise direction, when the set lever 202 starts to move to the right, the pawl portion 212*a* is engaged by the pawl portion 206*a*, and it starts to move to the right as viewed in the drawing under the action of long slots 212*b* and structure members 215. A latch pawl 216 is pivotally mounted about a shaft 217 on the return lever 212 and is urged always in the clockwise direction by a spring (not shown), and is provided with a pawl portion 216*a* to engage a pawl portion of a blade opening lever to be described later, and a trapezoidal portion 216*b* to abut on a stopper 218. The blade opening lever 219 opens and closes a shutter (not shown) and is provided with pawl portions 219*a*, 219*b*, 219*c* and a blade opening pin portion 219*d*. Because it is usually urged by a spring 220, it turns about a shaft 221 to abut on a stopper 222.

Next, we explain about the operation. As in the above-described embodiment, the output of the motor is transmitted to the gear 201. When the gear 201 rotates in the clockwise direction, the set lever 202 starts to move to the right. Upon a short movement, a phase difference is formed with respect to the slide lever 208, and the lever 206 turns in the counterclockwise direction until its pawl portion 206*a* engages with the pawl portion 212*a* of the return lever 212. Therefore, the return lever 212 starts to move in the same direction under the state of being engaged by the set lever 202. After that, as in the above-described embodiment, the number of pulse signals produced in accompaniment with the movement of the set lever 202 is compared with the EV value obtained from the light measuring circuit (not shown) upon coincidence to stop the motor. Then, the set lever 202 also stops from rightward movement. At this time, the pawl portion 216*a* of the latch pawl 216 engages with either one of the pawl portions of the blade opening lever 219. Thereby, a corresponding shutter opening state to the EV value obtained from the light measuring circuit (not shown) is determined.

After that, when the slide lever 208 catches up with the set lever 202, its convex portion 208*c* pushes the trapezoidal portion 206*b* of the lever 206 to turn the lever 206 in the clockwise direction. Thereby the pawl portion 212*a* of the return lever 212 and the pawl portion 206*a* of the lever 206 are taken out of engagement. The return lever 212 then starts to move to the left, as viewed in the drawing, by the power of the spring 213. At this time, because the pawl portion 216*a* of the latch pawl 216 is in engagement with either one of the pawl portions of the blade opening lever 219, the blade opening lever 219, while being engaged by the return lever 212, turns in the counterclockwise direction, and the shutter is opened. Then, when the return lever 212 returns to a position just before the position of FIG. 11, because the trapezoidal portion 216*b* of the latch pawl 216 turns in the counterclockwise direction in abutting engagement with the stopper 218, the latch pawl 216 and the blade opening lever 219 are taken out of engagement. The blade opening lever 219 turns in the clockwise direction by the power of the spring 220 and the shutter is closed.

When such an operation has ended, the motor (not shown) starts to rotate in the reverse direction; thereby, as has been described above, the gear 201 and the set lever 202 are taken out of engagement. The set lever 202 and the slide lever 208 then return, by the powers of the springs 203 and 209, to the position of FIG. 11.

Figure 12:
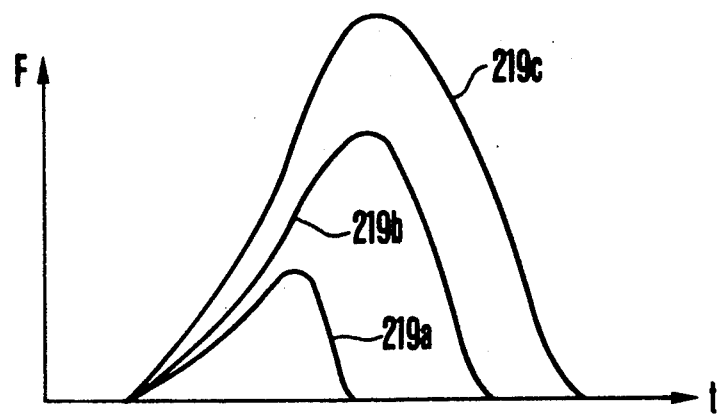
FIG. 12 is a graph to explain the waveforms of the opening of the shutter of the camera of FIG. 11.

In the above embodiment, an arrangement is shown in which the output of the motor is indirectly utilized, in other words, the charging of the shutter is performed by the output of the motor, and when in return, the opening and closing operation of the shutter is performed. This enables the shutter to open in three ways as shown in FIG. 12, depending on the stop position of the motor.

As has been described above, according to the present invention, the driving power transmitting device for a camera comprises a motor and a first driving member to move the driving power of the motor, first transmitting means arranged to engage with the first driving member when the first driving member has moved a prescribed distance in a prescribed direction, and to change the path of transmission of the driving power of the motor, a second driving member to be moved by the driving power of the motor, a follow-up member arranged to follow up in delay the second driving member, and second transmitting means for changing the path of transmission of the driving power of the motor when the follow-up member has caught up with the second driving member as the second driving member has stopped, whereby, the driving power of the motor is branchingly transmitted to each mechanism of the camera, giving very great advantages that the device is constructed in simple form at cheap cost.

What is claimed is:

1. A camera or a driving power transmitting device for a camera comprising:
(A) drive means for generating a driving power;
(B) first rotating means for rotation by the driving power of said drive means;
(C) a first operating portion of the camera for operating in response to rotation of said first rotating means;
(D) second rotating means for rotating in response to rotation of said first rotating means;
(E) a second operating portion of the camera for operating in response to rotation of said second rotating means;
(F) connecting means for causing said second rotating means to rotate in unison with said first rotating means after said first rotating means has rotated in a prescribed direction; and
(G) a third operating portion of the camera for operating in association with the rotation of said first rotating means while the first rotating means rotates in said prescribed direction until the second rotating means rotates in unison with the first rotating means, said third operating portion including an automatic focusing adjustment portion.

2. A camera or a device according to claim 1, wherein said drive means includes a motor.

3. A device according to claim 1, wherein said third operating portion further includes a focal length varying portion.

4. A camera or a device according to claim 1, wherein said first operating portion includes an exposure adjusting portion.

5. A camera or a device according to claim 4, wherein said operating portion of the camera includes an automatic focusing adjustment portion.

6. A camera or a driving power transmitting device for a camera comprising:
   (A) drive means for generating a driving power;
   (B) moving means for being moved by the driving power of said drive means;
   (C) a first operating portion of the camera for operating in response to movement of said moving means;
   (D) follow-up means for moving in following relation to said moving means, said follow-up means cutting off an operative connection of said first operating portion with said moving means by catching up with said moving means; and
   (E) a second operating portion of the camera for operating in response to movement of said moving means after the operative connection of said moving means with said first operating portion has been cut off.

7. A device according to claim 6, wherein said first operating portion includes an automatic focusing adjustment portion.

8. A camera or a device according to claim 6, wherein said second operating portion includes an exposure adjusting portion.

9. A camera or a device according to claim 6, further comprising:
   control means for stopping said moving means in order that said follow-up means catches up with said moving means.

10. A camera or a device according to claim 9, wherein
   (a) said control means includes signal forming means for forming a focusing adjustment signal, whereby a stop position of said moving means is determined in response to a output of said signal forming means; and
   (b) said first operating portion includes an automatic focusing adjustment portion, whereby a focusing adjustment state of said automatic focusing adjustment portion varies depending on the stop position of said moving means.

11. A camera or a device according to claim 6, further comprising:
   resilient means for causing said follow-up means to follow up said moving means, whereby said follow-up means is operatively connected to said moving means through said resilient means.

12. A camera or a device according to claim 11, further comprising:
   speed governing means for delaying the movement of said follow-up means more than the movement of said moving means.

13. A camera or a device according to claim 6, wherein:
   (a) said moving means includes rotatable engaging means arranged, upon engagement with said first operating portion, to operate said first operating portion, and urging means for urging said engaging means in a direction to engage with said first operating portion; and
   (b) said follow-up means includes release means for releasing said engaging means from engagement with said first operating portion against said urging means when said follow-up means catches up with said moving means.

14. A camera or a device according to claim 9, wherein
   said control means includes re-start means for starting again a movement of said moving means after said follow-up means has caught up with said moving means, whereby said second operating portion operates in response to said moving means after said moving means has started to move again by said re-start means.

15. A camera or a device according to claim 14, wherein:
   (a) said control means includes signal forming means for forming an exposure control signal, whereby said moving means is stopped in a position corresponding to the output of said signal forming means; and
   (b) said second operating portion includes an exposure adjusting portion, whereby an exposure time is determined in response to a stop position of said moving means.

16. A camera or a device according to claim 14, wherein
   said control means includes timer means for causing said re-start means not to operate until said follow-up means catches up with said moving means.

17. A camera or a device according to claim 6, wherein said drive means includes a motor.

18. A camera or a driving power transmitting device for a camera comprising:
   (A) a motor;
   (B) an automatic focusing adjustment device;
   (C) an exposure adjusting device;
   (D) an image recording medium feeding device;
   (E) first transmitting means for operating said automatic focusing adjustment device or said exposure adjusting device and thereafter causing said feeding device to effect a first operation by a rotation of said motor in a first direction;
   (F) second transmitting means for causing said image recording medium feeding device to effect a second operation by a rotation of said motor in a second direction;
   (G) first changeover means for changing over said first transmitting means between said automatic focusing adjustment device and said exposure adjusting device;
   (H) second changeover means for changing over a direction of rotation of said motor.

19. A camera or a device according to claim 18, wherein said image recording medium feeding device includes winding-up means for effecting said second operation.

20. A camera or a driving power transmitting device for a camera comprising:
   (A) drive means for generating a driving power, said drive means rotating to generate the driving power;
   (B) a first operating portion of the camera operating in association with rotation of said drive means;

(C) first rotating means rotating in association with rotation of said drive means;
(D) second rotating means rotating in association with said first rotating means;
(E) delay means for causing said second rotating means to start rotating after said first rotating means has rotated in a predetermined direction;
(F) a second operating portion of the camera operating in association with said second rotating means;
(G) a third operating portion of the camera which operates in association with the first rotating means while the delay means is operating; and
(H) control means for enabling arbitrary selection of the operation of said first operation portion and the operation of said second operation portion.

21. A camera or a device according to claim 20, wherein said drive means includes a motor.

22. A camera or a device according to claim 20, wherein said third operating portion includes an automatic focusing adjustment portion.

23. A camera or a device according to claim 20, wherein said third operating portion includes an exposure adjusting portion.

24. A camera or a device according to claim 20, wherein said second operating portion includes an image recording medium feeding portion.

25. A camera or a device according to claim 20, wherein said third operating portion includes a focal length varying portion.

26. A camera or a driving power transmitting device for a camera comprising:
(A) a motor;
(B) film winding means operating in association with rotation of said motor in a first direction;
(C) film rewinding means operating in association with rotation of said motor in a second direction;
(D) an operating portion of the camera driven by said motor when rotation of said motor is changed over from the first direction to the second direction; and
(E) delay means for preventing said film rewinding means from operating by the rotation of said motor in the second direction until an operation of said operating portion of the camera has been completed.

27. A camera or a device according to claim 26, wherein said operating portion of the camera includes an automatic focusing adjustment portion.

28. A camera or a device according to claim 26, wherein said operating portion of the camera includes an exposure adjusting portion.

29. A camera or a device according to claim 26, wherein said operating portion of the camera includes a focal length varying portion.

30. A camera or a device according to claim 26, further comprising cutting-off means for preventing a driving power of said motor from being transmitted to said operating portion of the camera while said film winding means is operating.

31. A camera or a driving power transmitting device for a camera comprising:
(A) drive means for generating a driving power;
(B) moving means for being moved by the driving power of said drive means; and
(C) follow-up means for moving to follow said moving means, said follow-up means controlling an operating amount of an operating portion of the camera in response to a position at which said follow-up means catches up with said drive means.

32. A camera or a device according to claim 31, wherein said operating portion of the camera includes an exposure adjusting portion.

33. A camera or a device according to claim 31, further comprising control means for stopping said moving means to cause said follow-up means to catch up with said moving means.

34. A camera or a device according to claim 31, further comprising resilient means for causing said follow-up means to follow said moving means, said follow-up means being connected to said moving means through said resilient means.

35. A camera or a device according to claim 31, further comprising speed governing means for delaying the movement of said follow-up means relative to the movement of said moving means.

36. A driving power transmitting device for a camera comprising:
(A) drive means for generating a driving power;
(B) first rotating means for rotation by the driving power of said drive means;
(C) a first operating portion of the camera for operating in response to rotation of said first rotating means, said first operating portion including an automatic focusing adjustment portion and an exposure adjusting portion;
(D) second rotating mans for rotating in response to rotation of said first rotating means;
(E) a second operating portion of the camera for operating in response to rotation of said second rotating means; and
(F) connecting means for causing said second rotating means to rotate in unison with said first rotating means after said first rotating means has rotated in a prescribed direction.

37. A driving power transmitting device for a camera comprising:
(A) drive means for generating a driving power;
(B) first rotating means for rotation by the driving power of said drive means;
(C) a first operating portion of the camera for operating in response to rotation of said first rotating means, said first operating portion including an automatic focusing adjustment portion;
(D) second rotating means for rotating in response to rotation of said first rotating means;
(E) a second operating portion of the camera for operating in response to rotation of said second rotating means, said second operating portion including an image residing medium feeding portion; and
(F) connecting means for causing said second rotating means to rotate in unison with said first rotating means after said first rotating means has rotated in a prescribed direction.

38. A camera or a driving power transmitting device for a camera, comprising:
(a) drive means for generating a driving power;
(b) first rotating means for rotation by the driving power of said drive means;
(c) a first operating portion of the camera for operating in response to rotation of said first rotating means;
(d) second rotating means for rotating in response to rotation of said first rotating means;
(e) a second operated portion of the camera for operating in response to rotation of said second rotating means;

(f) connecting means for causing said second rotating means to rotate in association with said first rotating means after said first rotating means has rotated in a prescribed direction; and (g) a third operating portion of the camera for operating in association with the rotating of said first rotating means while the first rotating means rotates in said prescribed direction until the second rotating means rotates in association with the first rotating means, said third operating portion including an automatic focusing adjustment portion.

39. A camera or a device according to claim 38, wherein said drive means includes a motor.

40. A camera or a device according to claim 38, wherein said third operating portion further includes a focal length varying portion.

41. A camera or a device according to claim 38, wherein said first operating portion includes an exposure adjusting portion.

42. A camera or a driving power transmitting device for a camera, comprising:
(a) drive means for generating a driving power;
(b) first rotating means for rotation by the drive power of said drive means;
(c) a first operating portion of the camera for operating in response to rotation of said first rotating means;
(d) second rotating means for rotating in response to rotation of said first rotating means;
(e) a second operating portion of the camera for operating in response to rotation of said second rotating means;
(f) connecting means for causing said second rotating means to rotate in association with said first rotating means after said first rotating means has rotated in a prescribed direction; and
(g) a third operating portion of the camera for operating in association with the rotation of said first rotating means while the first rotating means starts to rotate in said prescribed direction until the second rotating means rotates in association with the first rotating means wherein said third operating portion further includes a focal length varying portion.

43. A camera or a driving power transmitting device according to claim 42, wherein said drive means includes a motor.

44. A camera or a driving power transmitting device according to claim 42, wherein said first operating portion includes an exposure adjusting portion.

45. A camera or a driving power transmitting device for a camera, comprising:
(a) drive means for generating a driving power;
(b) first moving means for movement by the driving power of said drive means;
(c) a first operating portion of the camera for operating in response to movement of said first moving means, said first operating portion including an automatic focusing adjustment portion and an exposure adjusting portion;
(d) second moving means for moving in response to movement of said first moving means;
(e) a second operating portion of the camera for operating in response to movement of said second moving means; and
(f) connecting means for causing said second moving means to move in association with said first moving means after said first moving means has moved in a prescribed direction.

46. A camera or a driving power transmitting device for a camera, comprising:
(a) drive means for generating a driving power;
(b) first rotating means for rotation by the driving power of said drive means;
(c) a first operating portion of the camera for operating in response to rotation of said first rotating means, said first operating portion including an automatic focusing adjustment portion and an exposure adjusting portion;
(d) second rotating means for rotating in response to rotation of said first rotating means;
(e) a second operating portion of the camera for operating in response to rotation of said second rotating means; and
(f) connecting means for causing said second rotating means to rotate in association with said first rotating means after said first rotating means has rotated in a prescribed direction.

47. A camera or a driving power transmitting device for a camera, comprising:
(a) drive means for generating a driving power;
(b) first rotating means for rotation by the driving power of said drive means;
(c) a first operating portion of the camera for operating in response to rotation of said first rotating means, said first operating portion including an automatic focusing adjustment portion;
(d) second rotating means for rotating in response to rotation of said first rotating means;
(e) a second operating portion of the camera for operating in response to rotation of said second rotating means, said second operating portion including an image recording medium feeding portion; and
(f) connecting means for causing said second rotating means to rotate in association with said first rotating means after said first rotating means has rotated in a prescribed direction.

48. A camera or a driving power transmitting device for a camera, comprising:
(a) drive means for generating a driving power;
(b) first moving means for movement by the driving power of said drive means;
(c) a first operating portion of the camera for operating in response to movement of said first moving means;
(d) second moving means for moving in response to movement of said first moving means;
(e) a second operating portion of the camera for operating in response to movement of said second moving means;
(f) connecting means for causing said second moving means to move in unison with said first moving means after said first moving means has moved in a prescribed direction; and
(g) a third operating portion of the camera for operating in association with the movement of said first moving means while the first moving means moves in said prescribed direction until the second moving means moves in unison with the first moving means, said third operating portion including an automatic focusing adjustment portion.

49. A camera or a device according to claim 48, wherein said drive means includes a motor.

50. A camera or a device according to claim 48, wherein said third operating portion further includes a focal length varying portion.

51. A camera or a device according to claim 48, wherein said first operating portion includes an exposure adjusting portion.

52. A camera or a driving power transmitting device for a camera, comprising:
   (a) drive means for generating a driving power, said drive means moving to generate the driving power;
   (b) a first operating portion of the camera operating in association with movement of said drive means;
   (c) first moving means moving in association with movement of said drive means;
   (d) second moving means moving in association with said first moving means;
   (e) delay means for causing said second moving means to start moving after said first moving means has moved in a predetermined direction;
   (f) a second operating portion of the camera operating in association with said second moving means;
   (g) a third operating portion of the camera which operates in association with the first moving means while the delay means is operating; and
   (h) control means for enabling arbitrary selection of the operation of said first operating portion and the operation of said second operating portion.

53. A camera or a device according to claim 52, wherein said drive means includes a motor.

54. A camera or a device according to claim 52, wherein said third operating portion includes an automatic focusing adjustment portion.

55. A camera or a device according to claim 52, wherein said third operating portion includes an exposure adjusting portion.

56. A camera or a device according to claim 52, wherein said second operating portion includes an image recording medium feeding portion.

57. A camera or a device according to claim 52, wherein said third operating portion includes a focal length varying portion.

58. A camera or a driving power transmitting device for a camera, comprising:
   (a) driving means for generating a driving power;
   (b) first moving means for movement by the driving power of said drive means;
   (c) a first operating portion of the camera for operating in response to movement of said first moving means, said first operating portion including an automatic focusing adjustment portion and an exposure adjustment portion;
   (d) second moving means for moving in response to movement of said first moving means;
   (e) a second operating portion of the camera for operating in response to movement of said second moving means; and
   (f) connecting means for causing said second moving means to move in unison for said first moving means after said first moving means has moved in a prescribed direction.

59. A camera or a driving power transmitting device for a camera, comprising:
   (a) driving means for generating a driving power;
   (b) first moving means for movement by the driving power of said drive means;
   (c) a first operating portion of the camera for operating in response to movement of said first moving means, said first operating portion including an automatic focusing adjustment portion;
   (d) second moving means for moving in response to movement of said first moving means;
   (e) a second operating portion of the camera for operating in response to movement by said second moving means, said second operating portion including an image recording medium feeding portion; and
   (f) connecting means for causing said second moving means to move in unison with said first moving means after said first moving means has moved in a prescribed direction.

60. A camera or a driving power transmitting device for a camera, comprising:
   (a) driving means for generating a driving power;
   (b) first moving means for movement by the driving power of said drive means;
   (c) a first operating portion of the camera for operating in response to movement of said first moving means;
   (d) second moving means for moving in response to movement of said first moving means;
   (e) a second operating portion of the camera for operating in response to movement by said second moving means;
   (f) connecting means for causing said second moving means to move in association with said first moving means after said first moving means has moved in a prescribed direction; and
   (g) a third operating portion of the camera for operating in association with the movement of said first moving means while the first moving means moves in said prescribed direction until the second moving means moves in association with said first moving means, said third operating portion including an automatic focusing adjustment portion.

61. A camera or a device according to claim 60, wherein said drive means includes a motor.

62. A camera or a device according to claim 60, wherein said third operating portion further includes a focal length varying portion.

63. A camera or a device according to claim 60, wherein said first operating portion includes an exposure adjusting portion.

64. A camera or a driving power transmitting device for a camera, comprising:
   (a) drive means for generating a driving power;
   (b) first moving means for movement by the driving power of said drive means;
   (c) a first operating portion of the camera for operating in response to movement of said first moving mans;
   (d) second moving means for moving in response to movement of said first moving means;
   (e) a second operating portion of the camera for operating in response to movement of said second moving means;
   (f) connecting means for causing said second moving means to move in association with said first moving means after said first moving means has rotated in a prescribed direction; and
   (g) a third operating portion of the camera for operating in association with the movement of said first moving means while the first moving means starts to move in said prescribed direction until the second moving means moves in association with the first moving means wherein said third operating portion includes a focal length varying portion.

65. A camera or a device according to claim 64, wherein said drive means includes a motor.

66. A device according to claim 64, wherein said first operating portion includes an exposure adjusting portion.

67. A camera or a driving power transmitting device for a camera, comprising:
  (a) drive means for generating a driving power;
  (b) first moving means for movement by the driving power of said drive means;
  (c) a first operating portion of the camera for operating in response to movement of said first moving means, said first operating portion including an automatic focusing adjustment portion;
  (d) second moving means for moving in response to movement of said first moving means;
  (e) a second operating portion of the camera for operating in response to movement of said second moving means, said second operating portion including an image recording medium feeding portion; and
  (f) connecting means for causing said second moving means to move in association with said first moving means after said first moving means has moved in a prescribed direction.

* * * * *